United States Patent
Gourara et al.

(10) Patent No.: US 9,533,686 B2
(45) Date of Patent: Jan. 3, 2017

(54) METHOD AND DEVICE FOR CONTROLLING THE RESTARTING OF A VEHICLE PROVIDED WITH AN AUTOMATIC TRANSMISSION

(71) Applicant: RENAULT s.a.s., Boulogne-Billancourt (FR)

(72) Inventors: Amine Gourara, Saint Germain les Arpajon (FR); Vincent Duvivier, Janville sur Juine (FR); Frederic Roudeau, Vitry sur Seine (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/777,328

(22) PCT Filed: Mar. 27, 2014

(86) PCT No.: PCT/FR2014/050724
§ 371 (c)(1),
(2) Date: Sep. 15, 2015

(87) PCT Pub. No.: WO2014/155010
PCT Pub. Date: Oct. 2, 2014

(65) Prior Publication Data
US 2016/0031446 A1 Feb. 4, 2016

(30) Foreign Application Priority Data
Mar. 29, 2013 (FR) .................................... 13 52895

(51) Int. Cl.
*B60W 30/18* (2012.01)
*B60W 10/02* (2006.01)
*B60W 10/06* (2006.01)

(52) U.S. Cl.
CPC ........ *B60W 30/18018* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

2003/0036837 A1* 2/2003 Katayama .............. B60K 28/16
701/69
2006/0184304 A1 8/2006 Katou et al.
(Continued)

FOREIGN PATENT DOCUMENTS

EP 1 258 386 A2 11/2002
EP 1 505 309 A2 2/2005

OTHER PUBLICATIONS

International Search Report Issued Jun. 24, 2014 in PCT/FR14/050724 Filed Mar. 27, 2014.
(Continued)

*Primary Examiner* — Justin Holmes
(74) *Attorney, Agent, or Firm* — Oblon, McClelland, Maier & Neustadt, L.L.P.

(57) ABSTRACT

A method for controlling automatic restarting of a vehicle including an automatic transmission, when the driver releases a brake pedal or pushes an accelerator pedal, the method including: a first phase of cranking an engine during which engine torque starts to increase without being transmitted to wheels of the vehicle, followed by a second launching phase during which the engine torque is gradually transmitted to the wheels, wherein the engine torque is controlled at a torque set value to be transmitted to the wheels, satisfying a launching time objective.

9 Claims, 2 Drawing Sheets

(52) U.S. Cl.
CPC ......... *B60W 30/18027* (2013.01); *B60W 2510/0657* (2013.01); *B60W 2540/10* (2013.01); *B60W 2540/12* (2013.01); *B60W 2710/0666* (2013.01); *B60W 2710/105* (2013.01)

(56) References Cited

U.S. PATENT DOCUMENTS

| | | | | |
|---|---|---|---|---|
| 2007/0102207 | A1* | 5/2007 | Yamanaka | B60K 6/48 180/65.31 |
| 2007/0202991 | A1* | 8/2007 | Matsumura | F16D 28/00 477/174 |
| 2008/0058154 | A1* | 3/2008 | Ashizawa | B60K 6/36 477/5 |
| 2010/0174465 | A1 | 7/2010 | Gibson et al. | |
| 2010/0312422 | A1* | 12/2010 | Imaseki | B60K 6/365 701/22 |
| 2013/0281260 | A1 | 10/2013 | Gibson et al. | |

OTHER PUBLICATIONS

French Search Report Issued Jan. 10, 2014 in French Application No. 1352895 Filed Mar. 29, 2013.

\* cited by examiner

METHOD AND DEVICE FOR CONTROLLING THE RESTARTING OF A VEHICLE PROVIDED WITH AN AUTOMATIC TRANSMISSION

BACKGROUND OF THE INVENTION

The present invention relates to applications for automatic cut-off of the engine when the vehicle is stopped with restarting using the foot lever of the brake pedal and/or pressing of the accelerator pedal by the driver, referred to as "stop and start", in vehicles which are provided with automatic or automated transmissions which are provided with a system for progressive coupling of the engine with the transmission during restarting operations.

More specifically, it relates to a method and a device for controlling the automatic restart of a vehicle which is provided with an automatic transmission when the brake pedal is released or the accelerator pedal is pressed by the driver.

In vehicles which are provided with automatic transmissions, the demands in terms of driving performance and comfort require a particularly reduced automatic "restart" time of the vehicle. This restriction involves rapidly increasing the engine torque in the restart phase in various situations of automatic stoppage of the engine during travel, and reducing, to the greatest possible extent, the time for transferring the engine torque to the wheels.

In most current "Stop and Start" applications, the "reliability" of the engine torque transmitted when starting is prioritized. To this end, there is defined a high engine speed threshold, below which the torque transfer to the transmission system is not established.

The threshold is generally similar to the establishment of the deceleration speed. This option unfortunately becomes evident as a particularly significant delay in authorization of the transmission of the torque to the wheels, which does not allow the objectives for reducing the restart time to be complied with.

The methods in which a minimum speed threshold is imposed on the engine before authorizing the transmission of the torque to the transmission in particular have the following disadvantages:
- if the threshold is selected to be at the lowest level (towards the "autonomous" engine speed threshold), the engine torque available is at risk of being less than the instruction to be transmitted to the gearbox in order to prevent stalling and to be able to start as quickly as possible,
- if it is selected to be at the highest level, besides the loss of time connected with the transfer delay, the time for which the torque is available at the wheels may be affected by the non-linearity of the instantaneous speed profile in accordance with time.

SUMMARY OF THE INVENTION

An object of the present invention is to dispense with an engine speed threshold which is imposed in order to authorize the transfer of the engine torque to the wheels, in order to reduce the start time.

To this end, it makes provision for the engine torque to be dependent on a torque instruction to be transmitted to the wheels which corresponds to compliance with an objective start time.

To this end, the device proposed comprises a start control module which informs the transmission processor of the engine speed, the effective engine torque, the target engine torque, the target wheel torque and the authorization to take the torque at the time at which the coupling begins.

BRIEF DESCRIPTION OF THE SEVERAL VIEWS OF THE DRAWINGS

The present invention will be better understood from a reading of the following non-limiting description of an embodiment thereof, with reference to the appended drawings, in which.

DETAILED DESCRIPTION OF THE INVENTION

Figure 1:
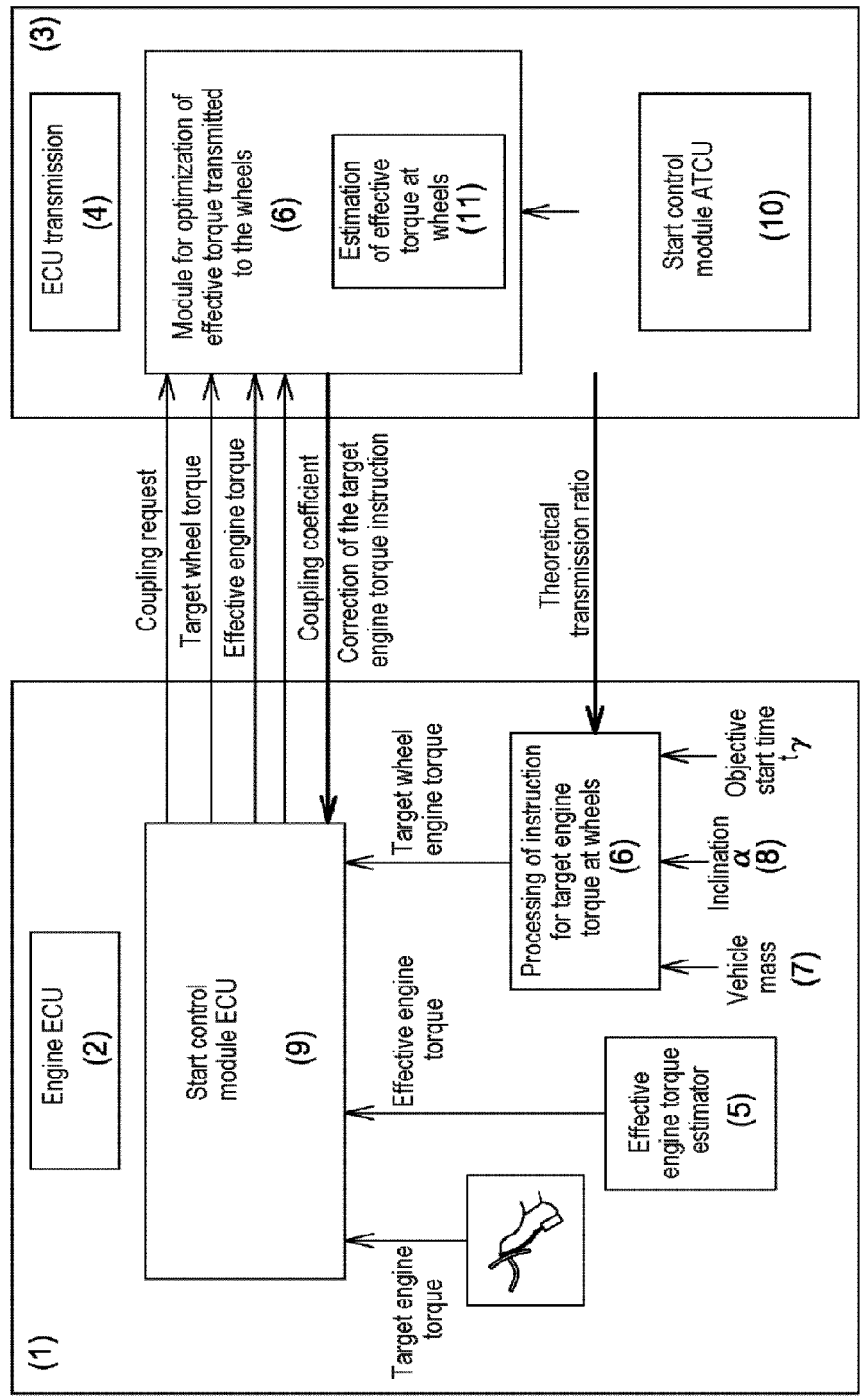
FIG. 1 is a block diagram of the device of the invention.

The device of FIG. 1 is composed of the engine processor or injection processor (Engine ECU) 2 of the engine 1 (which is not illustrated) and the automatic transmission processor 4 (Transmission ECU) of the vehicle (not illustrated).

Within the ECU 2, a start control module 9 receives information relating to the target engine torque from the driver's accelerator pedal, and information relating to the effective engine torque from an effective torque estimator 5. The module 9 further receives an instruction which relates to target engine torque at the wheels and which is processed in an optimization module 6, from the mass m of the vehicle (mass estimator 7), information relating to the inclination of the road a (inclination estimator 8), an objective start time $t_y$, and the theoretical transmission ratio.

Within the Transmission ECU 4, a module for optimizing the effective torque 11 transmitted to the wheels receives an instruction from a start control module ACTU 10. The optimization module 11 receives from the start control module ECU 9 a coupling request, the target torque at the wheels and the effective engine torque. In return, it transmits to the optimization module a coupling coefficient of the transmission to the engine, and a correction of the target engine torque instruction.

Figure 2:
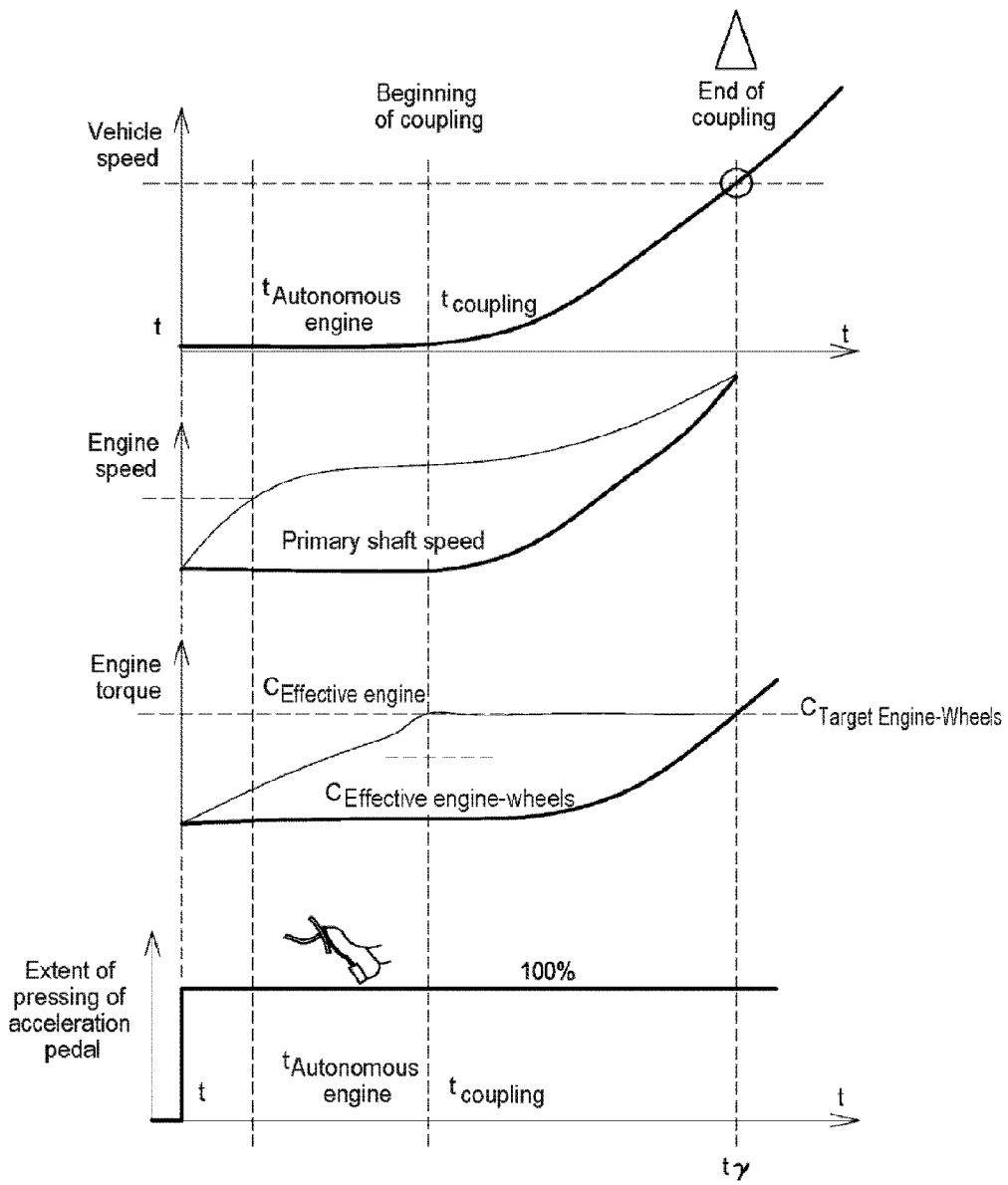
FIG. 2 illustrates the torque control.

With reference to FIG. 2, it can be seen that the start operation is carried out in compliance with a time objective which is fixed by the coupling end time $t_y$, at which the vehicle must have started and reached a target acceleration γ imposed by the device. During this operation, it is possible to distinguish between two operating phases. The first phase, or start-up phase of the engine, begins at the time t=0 at which the driver presses his acceleration pedal or releases his brake pedal. In the diagram, the degree to which the accelerator pedal is pressed increases suddenly. During this first phase, the engine speed and the effective engine torque increase, without the primary shaft of the gearbox rotating (primary speed=0), or the vehicle moving (vehicle speed=0).

The authorization to take the torque is given as soon as the effective engine torque reaches its target. This is the time at which the coupling $t_{coupling}$, which is mentioned in FIG. 2, begins and at which the effective torque becomes greater than the target engine torque instruction which is intended to be transmitted to the wheels. From this time, the system progressively couples the transmission to the engine, optimizing the coupling coefficient in order to move the vehicle as soon as possible. The primary shaft begins to rotate and the vehicle begins to move. This second phase continues until time $t_y$ when all the engine torque is transmitted to the wheels. The effective torque at the wheels has caught up with the effective engine torque and the vehicle has reached its target acceleration. This time complies with the objective start time for the proposed control strategy, where the engine torque is dependent on a torque instruction to be transmitted to the wheels which corresponds to compliance with an objective restart time.

Without departing from the scope of the invention, the time t=0 may not be the time at which the accelerator pedal is pressed down, but instead the time at which the brake pedal is released. In this instance, the engine is started earlier and the engine speed may begin to increase before the accelerator pedal is pressed. The remainder of the operation is the same.

The device described ensures control of the automatic restart of a vehicle which is provided with an automatic transmission when the brake pedal is released or when the accelerator pedal is pressed by the driver. It comprises a first phase for starting the engine, during which the engine torque begins to increase without being transmitted to the wheels, followed by a second start phase, during which it is progressively transmitted to the wheels.

The operation thereof is as follows. During the phase for automatic cut-off of the engine in the stopped state, the driver expresses his desire to start the vehicle by raising his foot from the brake pedal and optionally pressing on the accelerator pedal. This action brings about the automatic restart of the engine, followed by the coupling of the transmission in order to start the vehicle. The desire for acceleration requested by the driver by the brake and/or accelerator pedals is translated into a target engine torque in order to obtain a target wheel torque.

The start control module 9 of the Engine ECU 2 informs the Transmission ECU 4 of the following parameters:
authorization to take the torque via the engine/transmission coupling device at the time $t_{coupling}$ (beginning of coupling),
engine speed,
effective engine torque,
target engine torque,
target wheel torque.

The Transmission ECU 4 informs the Start control module 9 of the Engine ECU 2 of the following parameters:
engine/transmission coupling coefficient,
request for modulation of the target engine torque.

The optimization of the transmission coefficient is carried out by means of mappings in accordance with the engine speed, the effective engine torque, the target wheel torque, the mass of the vehicle and the inclination.

The transmission control system may optionally modulate the engine torque instruction during the start phase, until the coupling device has reached its maximum transmission coefficient.

The method proposed has the advantage of not imposing the calibration of the speed threshold in accordance with the temperature of the engine water, and the load of the accessories of the engine. It ensures the control of the torque transmitted to the wheels, which is necessary in order to ensure that an objective start time is complied with.

The invention claimed is:

1. A control method for automatic restart of a vehicle including an automatic transmission when a brake pedal is released or when an accelerator pedal is pressed by a driver, the method comprising:
starting an engine during which engine torque begins to increase without being transmitted to wheels of the vehicle; and
progressively transmitting the engine torque to the wheels while being dependent on a torque instruction to be transmitted to the wheels which complies with an objective start time,
wherein authorization to take torque via a coupling system of the engine and the transmission is given to a transmission processor by an injection processor of the engine at a time at which effective engine torque has reached the torque instruction to be transmitted to the wheels.

2. The control method as claimed in claim 1, wherein the transmission processor informs the injection processor of a coupling coefficient of the engine and the transmission.

3. The control method as claimed in claim 1, wherein the transmission processor informs the injection processor of a request for modulation of a target engine torque.

4. The control method as claimed in claim 3, wherein a transmission coefficient is optimized from mappings established in accordance with engine speed, effective engine torque, target wheel torque, mass of the vehicle, and inclination.

5. The control method as claimed in claim 1, wherein the transmission processor modulates the torque instruction during a start phase until a coupling device reaches a maximum transmission coefficient thereof.

6. A control device for automatic restart of a vehicle including an automatic transmission when a brake pedal is released or when an accelerator pedal is pressed by the driver, the control device comprising:
an engine start control module in an injection processor to control a start, to inform a transmission processor of engine speed, effective engine torque, target engine torque, target wheel torque, and authorization to take torque at a time at which coupling begins,
wherein the transmission processor informs the engine start control module of a coupling coefficient of an engine and a transmission.

7. The control device as claimed in claim 6, further comprising an optimization module in the transmission processor for torque transmitted to wheels which transmits to the engine start control module of the injection processor a coupling coefficient of the transmission and a correction of a target engine torque instruction.

8. A control device for automatic restart of a vehicle including an automatic transmission when a brake pedal is released or when an accelerator pedal is pressed by the driver, the control device comprising:
an engine start control module in an injection processor to control a start, to inform a transmission processor of engine speed, effective engine torque, target engine torque, target wheel torque, and authorization to take torque at a time at which coupling begins, and
an optimization module in the transmission processor for torque transmitted to wheels which transmits to the engine start control module of the injection processor a coupling coefficient of the transmission and a correction of a target engine torque instruction
wherein the transmission processor informs the engine start control module of a coupling coefficient of an engine and a transmission, and
wherein optimization of a transmission coefficient is carried out by mappings in accordance with the engine speed, the effective engine torque, the target wheel torque, a mass of the vehicle, and inclination.

9. A control device for automatic restart of a vehicle including an automatic transmission when a brake pedal is released or when an accelerator pedal is pressed by the driver, the control device comprising:
- an engine start control module in an injection processor to control a start, to inform a transmission processor of engine speed, effective engine torque, target engine torque, target wheel torque, and authorization to take torque at a time at which coupling begins, and
- an optimization module in the transmission processor for torque transmitted to wheels which transmits to the engine start control module of the injection processor a coupling coefficient of the transmission and a correction of a target engine torque instruction
- wherein the transmission processor informs the engine start control module of a coupling coefficient of an engine and a transmission, and
- wherein the transmission processor comprises a transmission start control module.

* * * * *